Sept. 28, 1926.  
T. RATCLIFFE  
COMBINATION TOOL  
Filed Sept. 10, 1925    3 Sheets-Sheet 2
1,601,645
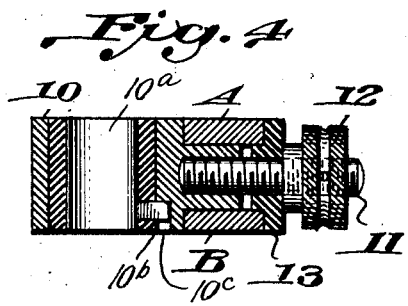
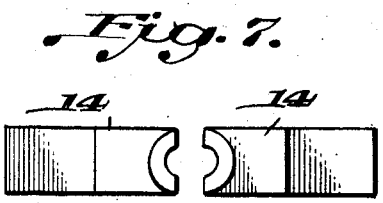
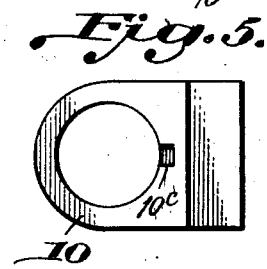
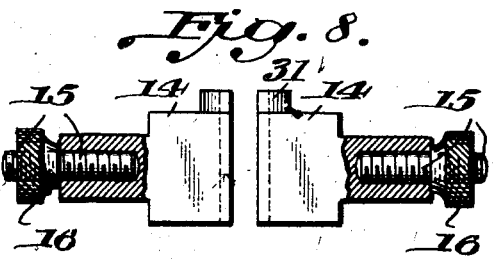
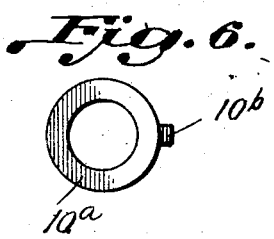
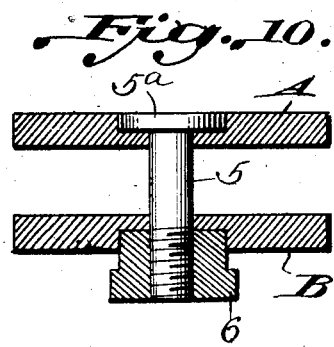
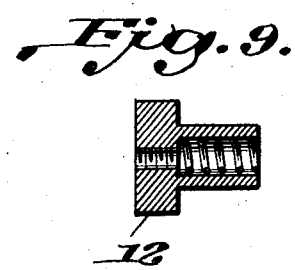
Inventor,
Thomas Ratcliffe
By Ruege, Bryce & Bakelar
Atty.

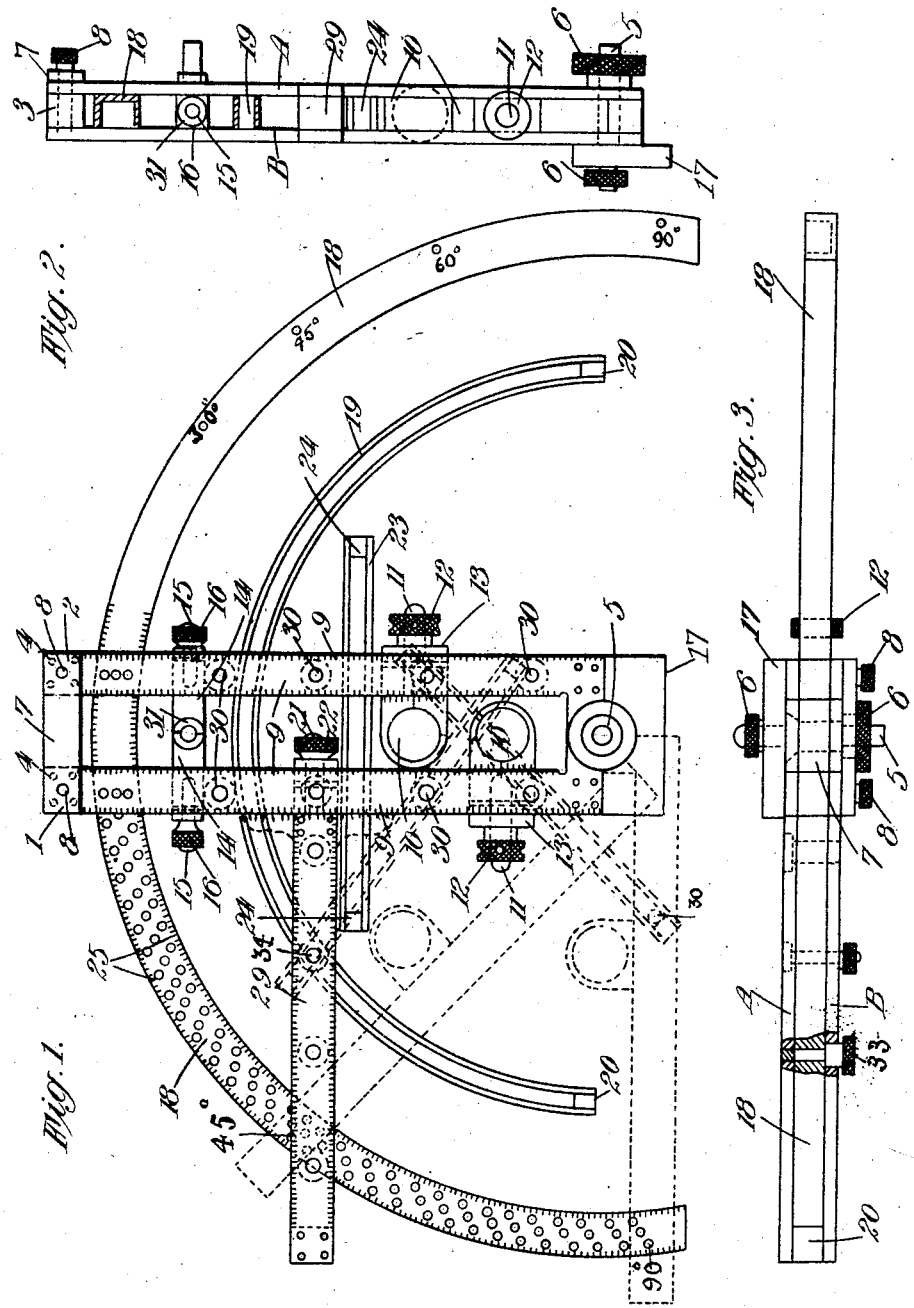

Sept. 28, 1926.  
T. RATCLIFFE  
1,601,645  
COMBINATION TOOL  
Filed Sept. 10, 1925  3 Sheets-Sheet 3
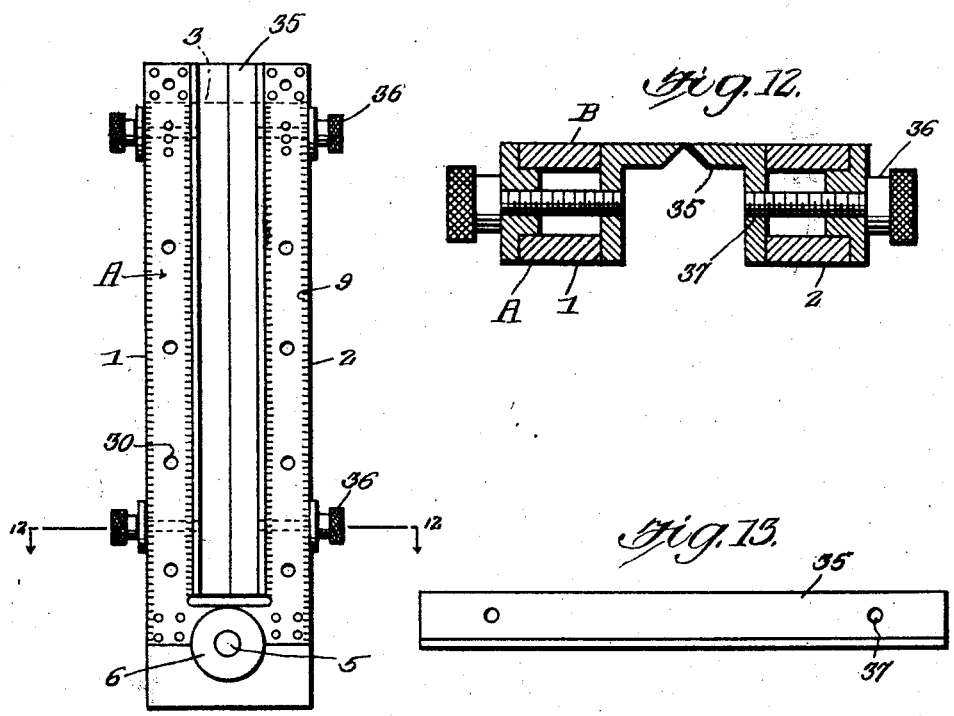
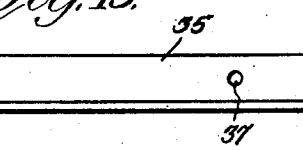
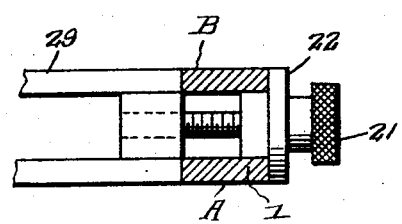
Inventor  
Thomas Ratcliffe,  
By Ruege, Boyce & Bakeler  
Attorneys Patented Sept. 28, 1926.

1,601,645

UNITED STATES PATENT OFFICE.

THOMAS RATCLIFFE, OF HARLESDEN, LONDON, ENGLAND.

COMBINATION TOOL.

Application filed September 10, 1925, Serial No. 55,635, and in Great Britain September 4, 1924.

My invention relates to a tool which may be used as a square, angle gauge, distance gauge, sine bar, drill jig and for many other purposes; and the objects of my invention are, first to save time in making jigs for repetition work, second, to increase accuracy in cases where jigs are not used, third, to avoid the necessity for using expensive milling machines and tool room lathes for making jigs.

I attain these objects by the tool illustrated in the accompanying drawings, in which:—

Fig. 1 is an elevation of a combination tool constructed according to this invention.

Fig. 2 is a side elevation of the same some of the parts being shown in section.

Fig. 3 is a plan of the same.

Fig. 4 is an enlarged detail sectional view illustrating the manner of securing the bush holders to the arms, a bush being shown in the bush holder.

Fig. 5 is a detail view of one of the holders illustrating the arrangement of the slot which receives the pin of the bush.

Fig. 6 is a detail view of a bush.

Figs. 7 and 8 are enlarged detail views of the gauge.

Fig. 9 is a detail sectional view of a nut having a spring arranged in a counterbore.

Fig. 10 is an enlarged detail sectional view of the arms, illustrating another form of pivot pin.

Fig. 11 is a front elevation of the pivoted arms showing the L-shaped straight-edges attached to the same.

Fig. 12 is a horizontal sectional view of the same taken substantially on the line 12—12 of Fig. 11.

Fig. 13 is a detail view of one of the L-shaped straight-edges.

Fig. 14 is a detail view of the third arm showing a bush holder mounted thereon.

Fig. 15 is a detail view of the scribing pin.

Fig. 16 is a detail view illustrating the manner of securing the third arm to one of the pivoted arms.

Similar numerals refer to similar parts throughout the several views.

1 and 2 are metal arms, each arm preferably consisting of two accurately parallel strips of steel A, B, of any convenient length, secured to each other by distance pieces 3 and rivets 4, at each end.

The arms 1 and 2 are hinged together after the manner of a folding rule by means of a hinge pin 5 which projects on each side of the joint and is provided with a clamping nut 6 on one or both sides of the joint.

The pin 5 is accurately turned to any convenient size outside the screw threads, a quarter of an inch being a very convenient size for ordinary purposes.

When the arms 1 and 2 are folded there is sufficient space between them to admit the bush holders 10, as shown at Fig. 1.

The arms may be secured in the folded position parallel to each other by means of a distance piece 7 and locking pins, 8, 8, at their free ends. The distance piece 7 is clamped to the front of the arms 1 and 2 by the said locking pins or screws 8.

The inside edges of the arms 1 and 2, or both edges, may have a graduated scale thereon, the said scales being graduated in inches and fractions of an inch, or in centimetres and millimetres, as may be most suitable or convenient.

10, 10, are bush holders which fit between the strips A, B, and slide freely between the said strips, the bush holders being capable of being secured to the arms at any desired point by means of clamping screws 11, 11, and nuts 12, 12. 13, 13, are flanged pieces of metal or washers to prevent the nuts 12 from injuring the arms 1 and 2.

The bush holders 10, 10, are always radial with the centre of the hinge pin 5 in every position of the arms and if the divisions on the graduated scales are small enough a vernier scale may be engraved on each bush holder, as shown by Fig. 1.

The bush holders 10 are adapted to receive bushes of various sizes to fit drills of different diameters when the tool is used as a jig for drilling holes, and the bushes $10^a$ are provided with pins $10^b$ and the bush holders are provided with slots $10^c$ to prevent the bushes from rising in the holders when drilling through them.

14 is a spacing gauge which also slides between the strips A, B, the said gauge being made in two portions as shown at Fig. 1, each portion of the gauge being adapted to be clamped to one of the arms by clamping screws 15 and nuts 16.

The spacing gauge 14 may be made with a half pin or half bush to fit in each portion of the gauge.

When the arms 1 and 2 are in the position shown by Fig. 1, the centres of the holes in the bush holders and the centre of the spacing gauge are all in line with the centres of the hinge pin 5 and equidistant from the inner edges of the arms 1 and 2.

17 is the setting plate which may be secured to the underside of the tool by means of the pin 5 and nut 6 when required, see Figs. 1 and 2. The setting plate 17 is rectangular and projects below the hinge joint of the arms 1 and 2 and provides a straight edge at the bottom of the instrument when required.

18 is a metal dividing arc which may be a full circle, a quadrant, or a semi-circle as shown.

The arc 18 is preferably of channel section for lightness and is perforated with a hole at each degree, the holes being staggered to allow of the holes being larger than they would be if all the holes were all on the same circumferential line.

The holes in the arc 18 are so arranged and numbered that when the arms are opened out the centres of the bush holders are at the required angle with each other, and radial with the pin 5.

The arms are held at the required angle by means of pins or bolts passing through the arms 1 and 2 and the dividing arc 18.

The dividing arc 18 may have a scale 25 engraved on one edge, or on both edges, thereof, the graduations being smaller than degrees, so that an angle containing degrees and a fraction of a degree may be obtained by means of the scale and the locking sector 19.

I wish it to be understood that the scales are engraved all round the dividing arc 18 and holes at each angle are provided all round the said arc, although only one side of the same is shown with such scales and holes on the drawing.

19 is the locking sector which is made of two curved strips of metal secured at each end to distance pieces 20.

The sector 19 is placed between the strips A and B and the sector is clamped to the arms or to either arm by bolts and wing nuts or clamping screws passing through the holes 30.

The sector 19 is movable up and down between the arms 1 and 2 so as to allow the bush holders 10 to be clamped to the arms in any desired position.

29 is a third arm which may be clamped to either of the arms 1, 2, by a clamping screw 21 and nut 22, and to the locking sector 19 by bolts and nuts or clamping screws.

The third arm 29 is constructed of two parallel strips of metal similar to the arms 1 and 2, and may have a scale similar to the scales on the arms engraved thereon and it also carries sliding bush holders similar to the bush holders 10, 10.

23 is the locking beam made of two strips of metal secured to each other by distance pieces 24 and rivets or screws, the beam 23 also sliding between the arms 1 and 2 and being used to rigidly connect the arms. The locking beam 23 slides in the holder arms 1 and 2 and is clamped by means of screws passing through holes in the arms which are sufficiently resilient to allow of a grip on the locking beam. The arms frictionally engage the locking beam which forms a rigid connection between the arms. When using the locking beam the locking sector is not required.

When the tool is used as a square, the arms are opened out to a right angle and clamped in that position by means of the beam 23, see dotted lines Fig. 1, the bush holders being removed, if necessary.

31 is a ring gauge for the purpose of ensuring accurate alignment of the half pins in the spacing gauge 14, but if the spacing gauge is provided with half bushes the outside of the ring gauge 31 may be used as a plug to ensure accurate alignment of the half bushes, or I may make use of a plug gauge for this purpose. The two halves of the spacing gauge are set accurately opposite each other by means of a plug or ring fitting into both halves or portions of the gauge.

In some cases I may form a collar 5ª on the hinge pin 5 and counterbore both arms to receive the said collar 5ª and omit the larger of the two nuts 6, using only the smaller nut marked 6 shown at the back of the tool, see Fig. 10; when so constructed the hinge pin 5 may be used either end to the front as desired.

Instead of using nuts and bolts to clamp the locking sector 19 and the locking beam 23 to the arms 1, 2, I may use set screws 33, see Fig. 3, these screws being passed through recesses in one of the pieces of metal forming an arm and engage with tapped holes in the other piece of metal.

I may also make the nuts 12, 16, and 22, hollow and fit springs therein to hold the bush holders, spacing gauge, and third arm against the arms 1 and 2 when moving them up and down the said arms as shown in Fig. 9.

I may also bush the holes in the arms 1 and 2 which receive the pins which secure the arms to the dividing arc 19.

I provide also two L section or approximately L section straight-edges 35 which may be attached to the arms 1 and 2 by means of clamping screws 36 similar to those used to clamp the bush holders to the arms, the straight edges being the same length as the inside edges of the said arms and of such a width that when the arms are folded together the inside edges of the straight-edges touch one another, these straight-edges will be found very useful in marking off in conjunction with the scales on the edges of the dividing arc 18 in cases where the angle between each mark is not obtainable by means of the holes in the dividing arc, marking off 100 teeth on a saw blank for example: the straight-edges may have scales engraved thereon. The clamping screws 36 engage threaded openings 37 in the L-shaped straight-edges as clearly illustrated in Fig. 12 of the drawings.

I provide also a scribing pin 38 to fit the bush holders; this is useful for accurate radial work, or to use with the tool as a height gauge, in this latter case the arms 1 and 2 are opened out to a right angle, locked with the sector 19, or the bar 23, and the bush holder with the scribing pin inserted clamped in position on the vertical arm and the work scribed with the scribing pin.

The tool may be used as a jig for drilling in several ways, for example:—

If used as a jig for drilling the bolt holes in cylinder flanges, a piece of sheet metal is fitted into the end of the cylinder, this piece of metal has a hole bored in the center thereof to fit the hinge pin 5 of the tool.

The pin 5 is placed in the said hole and one of the bush holders 10 is moved along the right hand arm until the centre of the bush holder and the centre of the pin 5 are the correct radius of the bolt circle apart. If the tool is not provided with scales thereon this distance is obtained by inserting a pin in the bush holder and measuring from the pin 5 to the pin in the bush holder with a micrometer or other suitable measuring instrument, allowing for the diameters of the pins. If the tool is provided with scales as shown, the distance is obtained direct by means of the scales.

The proper size of bush is then inserted in the bush holder placed over the place where the first hole is to be drilled and the tool clamped to the work, the hole is then drilled through the bush.

When the hole is drilled a plug is inserted through the bush and hole to keep the tool in position, the arms are then opened out to the required angle for the next hole and locked in this position by means of the dividing arc, and the locking sector if necessary.

The required radius is then measured off from the pin 5 to the bush holder on the left hand arm, as before, the proper size of bush inserted in the holder and the second hole drilled through the bush.

The plug is then removed from the first hole and the tool moved round until the plug can be placed in the second hole and the third hole drilled through one of the bushes, and so on until all the holes are drilled.

Or the right hand arm may remain fixed and the tool opened out for each hole until 180° is reached, after which the plug is placed in the last hole drilled and the operation repeated.

In order to make a jig for drilling a cylinder flange instead of using the tool every time a flange has to be drilled, I take a piece of mild steel of the required size and thickness and drill and ream a hole in the centre to receive the pin 5, I place the pin in the hole and move the bush holder in the right hand arm to the required radius and clamp it in that position, I drill and ream a hole through bush, I insert a pin in the reamed hole and move bush holder in left hand arm to the required radius, I then open out arms to correct angle and insert a pin through arm and dividing arc and drill and ream a second hole through bush in left hand arm bush holder, the pin or plug is then removed from the first hole and the tool moved round on the pin 5 as a centre until the pin or plug can be placed in the second hole I drill and ream a third hole through bush on other arm and move the tool as before and repeat until all the holes are drilled and reamed ready for bushing.

When the tool is used as a jig for drilling irregularly spaced holes, if any of the holes are on a circular curve, of which one of the holes to be drilled is the centre, the centre hole is drilled large enough to receive the pin 5 and the said pin placed in the hole, and a bush holder on each arm is set to the correct radius and angular space between two holes. These holes are then drilled and reamed through the bushes. The tool or one of the arms is then moved and bushes set to the angular distance for the next hole. If necessary a pin or plug is put through one hole and one bush and the operation of drilling and reaming repeated, and so on until all the holes on the curve are drilled and reamed. One arm is then locked by means of a plug inserted through bush into one of the drilled and reamed holes and the other arm and bush holder set for one of the other holes. The third arm is clamped to one of the arms and bush holders thereon set to locate two or more holes if possible. These holes are then drilled and reamed through the bushes and the operation repeated until all the holes are drilled and reamed. Finally the hole first drilled is opened out and reamed to the required size.

If the tool is required for drilling say three holes neither of which can be located by the pin 5 and the angle to which the arms are to be opened out is not obtainable by means of the dividing arc 18, the setting plate 17 is placed on the underside of the tool and secured by the clamping screw and nut 6 on the pin 5, the arms are opened out to the required distance by means of the spacing gauge 14, and micrometer if necessary, and clamped in this position by means of the locking sector 19, the tool is then placed on the work and squared up by means of the setting plate and clamped to the work, the bush holders on the arms 1 and 2, and if necessary on the arm 29, are then moved to the required position and clamped, the holes may then be drilled through the bushes as before stated.

The tool may be used in various other ways and for many other purposes too numerous to mention or hereinbefore set out in full, as a square or angle gauge, for instance, by removing bush holders and if necessary the dividing arc and locking sector and clamping the arms at the required angle by means of the locking beam.

I claim:—

1. A combination tool having two arms hinged together, bush holders sliding in said arms and adapted to be secured thereto in any desired position, a dividing arc adapted to be secured to said arms, a third arm carrying bush holders sliding in said arms and means for securing the third arm to either of the said arms, substantially as described.

2. A combination tool having two arms hinged together, bush holders sliding in said arms and adapted to be secured thereto, a third arm having bush holders sliding therein and adapted to be secured thereto, a dividing arc, and a locking member slidable in said arms and adapted to be secured to the same, substantially as described.

3. A combination tool having two arms hinged together and when closed arranged in spaced parallel relation to provide an intervening space between them and a bush holder provided with means for clamping it to either of the said arms and operating in the space between the same.

4. A combination tool having two arms hinged to one another, each arm consisting of two accurately parallel strips secured together and having means for spacing them apart, bush holders sliding in the space between said arms, bushes fitting in the holders, means for preventing the bushes from rising in said holders, means for clamping the bush holders to said arms, a locking sector slidable in the space between the arms, means for clamping the sector to the arms, and a graduated dividing arc adapted to be secured to each of said arms.

5. A combination tool having two arms hinged to one another, each arm consisting of two accurately parallel strips secured together and having means for spacing them apart, bush holders sliding in the space between said arms, bushes fitting in the holders, means for preventing the bushes from rising in said holders, means for clamping the bush holders to said arms, a locking sector slidable in the space between the arms, means for clamping the sector to the arms, a graduated dividing arc adapted to be secured to either of said arms, and a spacing gauge including two separable portions sliding in the said arms and clamped to the same.

6. A combination tool having two arms hinged to one another and each consisting of two accurately parallel strips secured together and having means for spacing them apart, a graduated dividing arm adapted to be secured to either of said arms, a third arm having suitable scales thereon and adapted to be clamped to either of the said arms, a locking beam slidable in the space between the arms and clamped to the same to form rigid connecting means, and a setting blade adapted to be secured to the tool on the pivot of the arms to provide a straight edge at the bottom of the tool.

T. RATCLIFFE.